(12) United States Patent
Toews et al.

(10) Patent No.: US 11,386,069 B2
(45) Date of Patent: Jul. 12, 2022

(54) SYSTEM AND METHOD FOR OFFBOARD VALIDATION OF VARIABLE PARAMETERS

(71) Applicant: HONEYWELL INTERNATIONAL INC., Morris Plains, NJ (US)

(72) Inventors: Philip Toews, Phoenix, AZ (US); Daniel E. Lewis, Glendale, AZ (US); Richard Snyder, Phoenix, AZ (US); I-Ping Fessler, Glendale, AZ (US); Robert Brownlee, Glendale, AZ (US)

(73) Assignee: HONEYWELL INTERATIONAL INC., Charlotte, NC (US)

( * ) Notice: Subject to any disclaimer, the term of this patent is extended or adjusted under 35 U.S.C. 154(b) by 274 days.

(21) Appl. No.: 16/716,716

(22) Filed: Dec. 17, 2019

(65) Prior Publication Data

US 2021/0182274 A1    Jun. 17, 2021

(51) Int. Cl.
*G06F 7/00* (2006.01)
*G06F 16/23* (2019.01)
*G06F 9/54* (2006.01)
*H04L 67/10* (2022.01)

(52) U.S. Cl.
CPC .......... *G06F 16/2365* (2019.01); *G06F 9/541* (2013.01); *H04L 67/10* (2013.01)

(58) Field of Classification Search
CPC ....... G06F 16/2365; G06F 9/541; H04L 67/10
USPC ......................................... 707/600–899, 690
See application file for complete search history.

(56) References Cited

U.S. PATENT DOCUMENTS

| | | |
|---|---|---|
| 9,470,549 B2 | 10/2016 | Geay et al. |
| 10,109,117 B2 | 10/2018 | Fournier et al. |
| 10,131,444 B1 | 11/2018 | Toews et al. |
| 10,228,692 B2 | 3/2019 | Prosser |
| 10,261,510 B2 | 4/2019 | Raynaud et al. |
| 10,274,339 B2 | 4/2019 | Van Den Bergh et al. |

(Continued)

FOREIGN PATENT DOCUMENTS

| | | |
|---|---|---|
| CN | 105096663 A | 11/2015 |
| WO | 2019048039 A1 | 3/2019 |

OTHER PUBLICATIONS

Randall J. Mumaw et al: "Evaluation Issues for a Flight Deck Interface CASR SE-210 Output 2 Report 4 of 6 Head-up Display Symbology Standardization View Project Speech Recognition View Project", 2019, pp. 1-74, XP055801125, Hampton, VA.

(Continued)

*Primary Examiner* — Isaac M Woo
(74) *Attorney, Agent, or Firm* — Lorenz & Kopf, LLP (57) ABSTRACT

A method in an aircraft for the validation of variable data is provided. The method comprises: receiving a request from an application program to retrieve data attributes for at least one data item to be entered via a GUI provided by the application program; requesting, from the flight management engine using an API, the data attributes for the at least one data item, wherein the data attributes identify at least one limit for data entry for the at least one data item including a minimum and/or maximum value for the at least one data item; receiving the requested data attributes from the flight management engine; and transmitting the data attributes to the application program; wherein the application program restricts data entry for the at least one data item in conformance with each limit provided by the data attributes for the at least one data item.

20 Claims, 4 Drawing Sheets

(56) References Cited

U.S. PATENT DOCUMENTS

| | | |
|---|---|---|
| 10,319,240 B2 | 6/2019 | Beernaert |
| 10,672,280 B1 * | 6/2020 | Barber ................. G08G 5/0021 |
| 2012/0290959 A1 | 11/2012 | Quine |
| 2017/0132942 A1 | 5/2017 | Mere |
| 2018/0225978 A1 | 8/2018 | Mere |
| 2019/0236246 A1 | 8/2019 | Kim et al. |

OTHER PUBLICATIONS

Schroeder, J.B., et al. "Developing Health Management for Current and Future Inventory Aircraft," IEEEAC paper #1390, version 3, updated Jan. 6, 2009.

* cited by examiner

SYSTEM AND METHOD FOR OFFBOARD VALIDATION OF VARIABLE PARAMETERS

TECHNICAL FIELD

Embodiments of the subject matter described herein relate generally to systems and methods for providing data to avionic systems. More particularly, embodiments of the subject matter relate to systems and methods for providing data to an aircraft's flight management system.

BACKGROUND

In a connected cockpit, applications can exist in the onboard avionics, in portable electronic devices such as EFBs, laptop computers, and tablets, and on ground based systems. These applications all share the need for user friendly GUIs A "user friendly GUI" makes it easy for a user to understand the context of data being shown to the user, and makes it obvious how to enter data needed for the application. If an application w ere created for a single aircraft, limits for a number of airplane specific data items such as maximum cruise altitude could be programmed into the application's GUI. But, in a connected world, applications can serve the needs of multiple different aircraft. Limits for a data item may vary from aircraft to aircraft. An application that can serve multiple aircraft may not have necessary information to guide a user to correctly enter data.

Hence, it is desirable to provide a system and method for providing data entry guidance to applications. Furthermore, other desirable features and characteristics of the present disclosure will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. Tis summary is not intended to identify key or essential features of the claimed subject matter, nor is it intended to be used as an aid in determining the scope of the claimed subject matter.

A system on an aircraft for the validation of variable data is disclosed. The system includes one or more processors configured by programming instructions on non-transient computer readable media. The system is configured to: provide a graphical user interface that includes one or more pages for display on a display device on the aircraft, wherein at least one of the pages includes one or more widgets for the entry of data. The system is further configured to cause the at least one page to be displayed on the display device; and request, from a flight management engine associated with the aircraft using an application program interface (API), data attributes for at least one widget on the displayed page, wherein the data attributes identify at least one limit for data entry wherein the at least one limit includes a minimum and/or maximum value for data input via the at least one widget. The system is further configured to receive the requested data attributes from the flight management engine; restrict data entry via the at least one widget in conformance with each limit provided by the data attributes for the widget; and transmit data entered via the at least one widget in conformance, with the received data attributes to the flight management engine.

Another system on an aircraft for the validation of variable data is disclosed. The system includes one or more processors configured by programming instructions on non-transient computer readable media. The system is configured to: receive a request from an application program to retrieve data attributes for at least one data item to be entered via a GUI provided by the application program, wherein the data attributes are internally computed by a flight management engine associated with the aircraft and used by the flight management engine to validate data; request, from the flight management engine using an application program interface (API), the data attributes for the at least one data item, wherein the data attributes identify at least one limit for data entry for the at least one data item includes a minimum and/or maximum value for the at least one data item receive the requested data attributes from the flight management engine; and transmit the data attributes to the application program, wherein the application program restricts data entry for the at least one data item in conformance with each limit provided by the data attributes for the at least one data item.

A method in an executable application on an electronic device on an aircraft during an aircraft mission is disclosed. The method includes providing a graphical user interface that includes one or more pages for display on a display device on an aircraft, wherein at least one of the pages includes one or more widgets for the entry of data causing the at least one page to be displayed on the display device; requesting, from a flight management engine using an application program interface (API), data attributes for at least one widget on the displayed page, wherein the data attributes identify at least one limit wherein the at least one limit includes a minimum and/or maximum value for data input via the at least one widget, receiving the requested data attributes from the flight management engine; restricting data entry via the at least one widget in conformance with each limit provided by the data attributes for the widget, and transmitting data entered via the at least one widget in conformance with the received data attributes to the flight management engine.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplar in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may car out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1A:
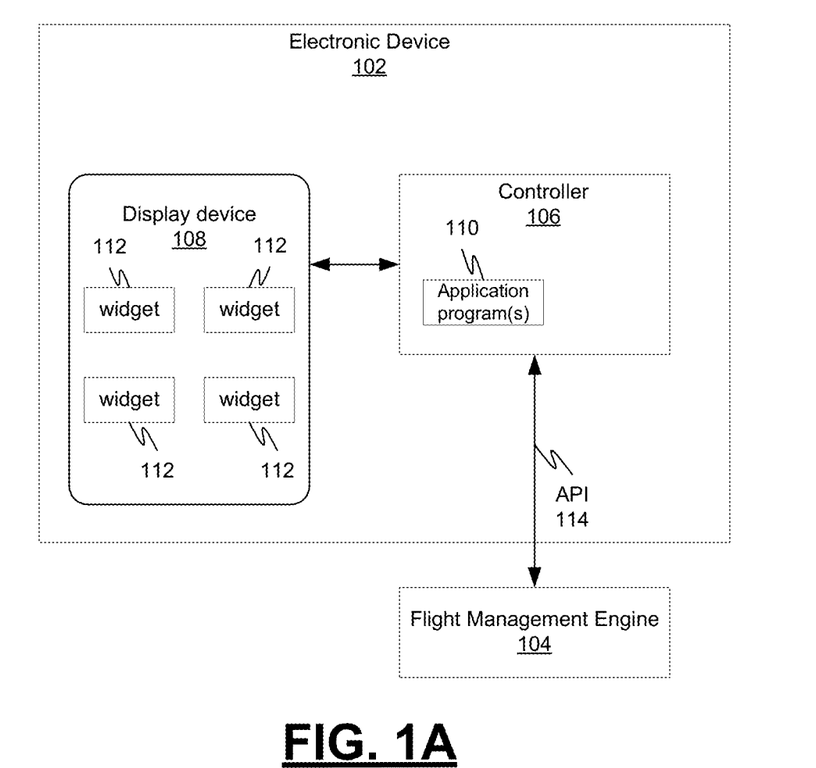
FIG. 1A is a block diagram depicting an example environment in which data is entered in an aircraft cockpit via an electronic device to avionics systems such as a flight management engine, in accordance with some embodiments.

FIG. 1A is a block diagram depicting an example environment 100 in which data is entered in an aircraft cockpit via an electronic device 102 to avionics systems such as a flight management engine 104. The electronic device 102 is a device for use in an aircraft cockpit during flight such as an electronic flight bag (EFB), tablet computer, laptop computer, or other electronic device that can execute applications that assist the flight crew during flight. The electronic device 102 includes a controller 106 and a display device 108. The controller 106, among other things, executes one or more applications 110 that can cause the display of a graphical user interface (GUI) on the display device 108. The GUI may include one or more pages of information for display on the display device 108. At least one of the pages from the GUI includes one or more widgets 110 that are displayed and can be used for the entry of data. In this example, the widgets 110 provide data entry points for use by the flight crew to enter data that can be sent by the controller 106 to avionics systems such as the flight management engine 104.

The controller 106 includes at least one processor and a computer-readable storage device or media encoded with programming instructions for configuring the controller 106. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM). EEPROMs (electrically erasable PROM), flash memory, or any other electric, magnetic, optical, or combination memory devices capable of storing data, some of which represent executable programming instructions, used by the controller 106.

An application program interfaced (API) 114 is provided in the example environment 100 to allow client applications 11 to communicate with a flight management engine 104, regardless of whether the flight management engine 104 exists in the cloud or physically onboard the aircraft. The API 114 defines the data that an application 110 can send to the flight management engine 104, and defines the data that the flight management engine 104 will send back to the application 110. For example, the definition of a flight plan and the expected weight of the aircraft could be passed from the application 110 to the flight management engine 104. The flight management engine 104 could then compute a lateral flight plan and perform vertical predictions along the plan, and output the resulting predicted data to the application 110 via the API 114.

Because the flight management engine 104 is relied on to produce correct, reliable information the flight crew can use to navigate the aircraft the flight management engine 104 has access to aircraft specific data, such as that found in an engine and/or aeronautical database, that provides aircraft limits. The flight management engine 104 used by an aircraft will be developed to meet the specific requirements of the aircraft for which it is deployed. To provide valid guidance to the flight crew, algorithms of the flight management engine 104 will define when data is valid and when it is not valid. This data definition includes such things as minimum and maximum values, flight state during which the data is valid, and flight state during which the data is invalid, among other things.

The API 114 is configured to allow the flight management engine 104 to provide the data definition to an external client (e.g., application 110). The flight management engine 114 can continue to validate data, but will also make public the data definition via the API so that an external client (e.g., application 100) nay also control the entry of data.

As an example, during flight, the flight management engine 104 knows what constitutes a valid cruise altitude and can make cruise altitude attributes available to the GUI of an application program 110 via the API 114. The application program 110, armed with know ledge of the cruise altitude attributes, can place appropriate limits on the entry of cruise altitude data from a widget 112. For example, if the maximum certified cruise altitude for an aircraft is 42000 feet, the application 10 (can limit the entry of cruise altitude data via a widget 112 to 42000 feet or less.

The amount of definition data returned via the API can vary. In some examples, the API may only return data properties for a single data item (or widget). In other examples, the API may return data properties for a plurality of data items or all data items the application may provide to the flight management engine 114.

In this example, the flight management engine can output current data for a data item as well as a data definition for the data item. In the cruise altitude example, the flight management engine could output and the API provide the following to the application:

```
"API": { "FPLN": "ACTIVE",
    "CRUISE_ALT": "39000",
  "CRUISE_ALT_DATA_DEFINITION": {
    "MININUM_ALTITUDE": "–1000",
    "MAXIMUM_ALTITUDE": "42000",
    "DEFAULT_ALTITUDE": "36000" }        }
```

Data attributes may include the minimum value for a data item, the maximum value for a data item, a default value for a data item as well as other attributes. The data attributes may include other things such as flight management state where the data is valid, valid operations based upon object being modified, valid operations based on the supported features within the flight management engine, and any other information that defines a data item.

As an example of flight management state restriction; a client GUI may contain a widget that allows for the entry of a climb speed with the intent of passing this information on to the flight management engine. The data definition of climb speed could contain information that prevents the entry of climb speed after the aircraft is beyond the climb flight phase of flight.

As an example of a valid operation restriction, a client GUI may contain a widget that allows for the entry of holding patterns at various waypoints in the flight plan. The data definition for waypoint data could include the availability of a waypoint for a holding pattern and restrict certain waypoints or waypoint types from holding patterns. Holding patterns may only be allowed at certain waypoint types by a specific flight management engine.

As an example of a flight management features, a client GUI may contain a widget that allows for the entry of noise abatement altitudes and speeds. However, not all flight management engines contain this feature, so the data definition of noise abatement data could include a feature availability data attribute to restrict the entry of noise abatement altitude and speeds when this feature is not provided by the flight management engine.

Figure 1B:
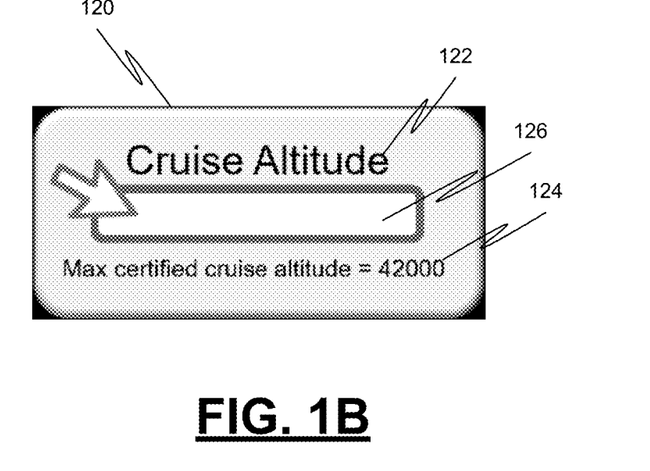
FIG. 1B is a diagram depicting an example widget that may be displayed via a GUI, in accordance with some embodiments.

FIG. 1B is a diagram depicting an example widget 120 that may be displayed via a GUI. The example widget 120 identifies via a title 122 that the widget is for the entry of cruise altitude. The example widget 120 includes a data entry block 126 for use by a user when entering data to the widget. The example widget 120 also includes a limits field 124 that, in this example, identifies that the maximum certified cruise altitude for the aircraft is 42000 feet.

Figure 2:
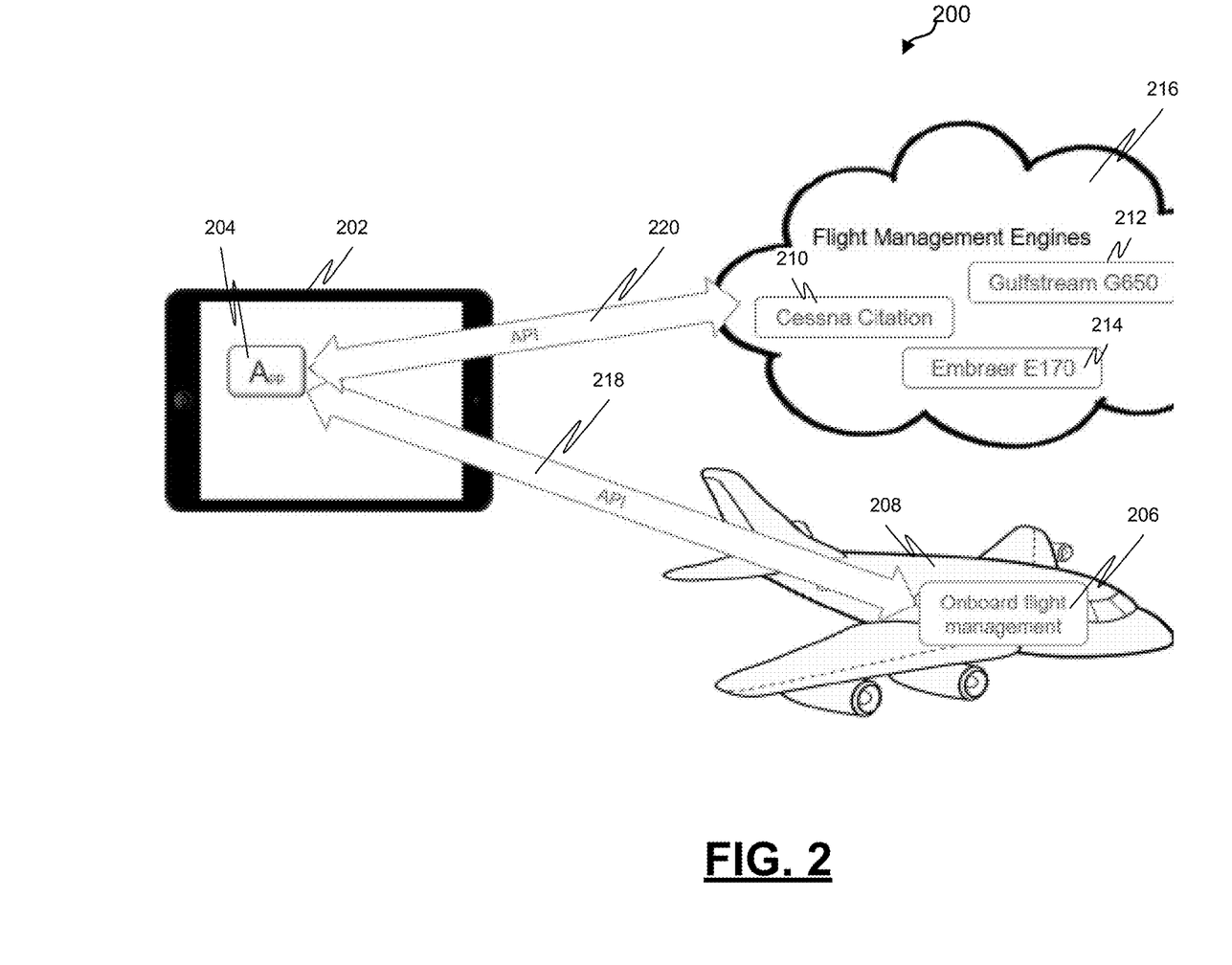
FIG. 2 is a block diagram depicting another example environment in which data is entered in an aircraft cockpit via an electronic device to a flight management engine, in accordance with some embodiments.

FIG. 2 is a block diagram depicting another example environment 200 in which data is entered in an aircraft cockpit via an electronic device 202 to a flight management engine 204. The electronic device 202, in this example, is a tablet computer, but could be other forms of electronic devices such as an EFB, laptop computer, or others that can execute applications 204 that can cause the display of a OUT on a display to provide assistance to the flight crew during flight.

As illustrated, the flight management engine may be an onboard flight management engine 206 located onboard the aircraft 208 on which the electronic device 202 is deployed during flight or one of a plurality of cloud based flight management engines 210, 212, 214 at a cloud-based location 216. An application program interfaced (API) 218 is provided in the example environment 200 to allow client applications 204 to communicate with an onboard flight management engine 206. An application program interfaced (API) 220 is also provided in the example environment 200 to allow client applications 204 to communicate with an the appropriate one of the plurality of cloud based flight management engines 210, 212, 214. The example onboard flight management engine 206 is implemented by a controller comprising one or more processors configured by programming instructions executing onboard the aircraft 208. Similarly, the example appropriate cloud-based flight management engine is implemented by one or more processors configured by programming instructions executing at a cloud-based facility 216 offboard the aircraft 206. The APIs 218, 220 define the data that the application 204 can send to the flight management engine, and defines the data that the flight management engine will send back to the application 204.

Figure 3:
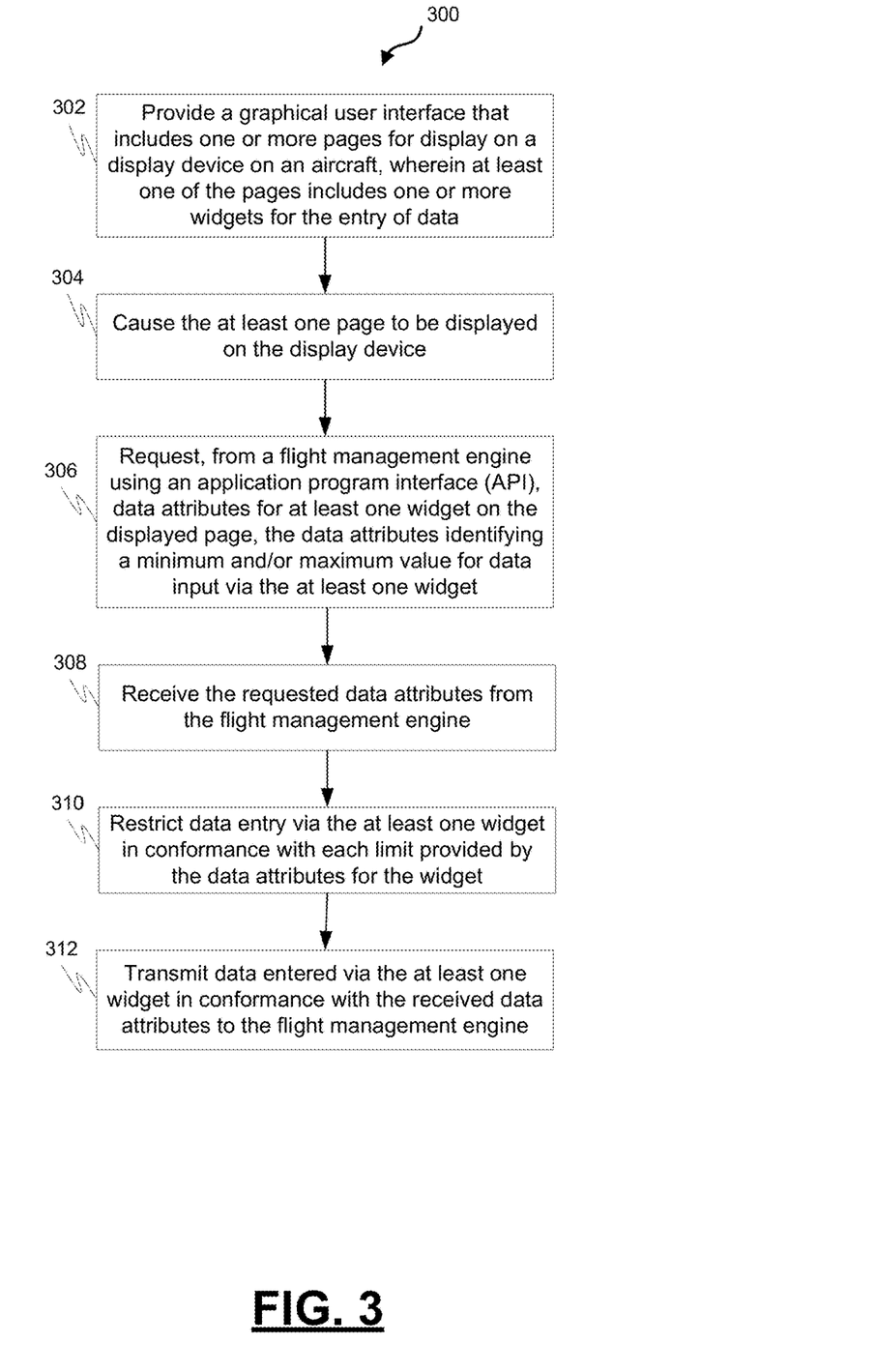
FIG. 3 is a process flow chart depicting an example process in an electronic device on an aircraft during an aircraft mission, in accordance with some embodiments.

FIG. 3 is a process flow chart depicting an example process 300 in an electronic device on an aircraft during an aircraft mission. The order of operation within the process 300 is not limited to the sequential execution as illustrated in the figure, but may be performed in one or more varying orders as applicable and in accordance with the present disclosure.

The example process 300 includes providing a graphical user interface that includes one or more pages for display on a display device on an aircraft, wherein at least one of the pages includes one or more widgets for the entry of data (operation 302) and causing the at least one page to be displayed on the display device (operation 304).

The example process 300 includes requesting and receiving, from a flight management engine using an application program interface (API), data attributes for at least one widget on the displayed page, wherein the data attributes identify at least one limit for data entry wherein the at least one limit includes a minimum and/or maximum value for data input via the at least one widget (operation 306). The flight management engine may execute onboard the aircraft. The flight management engine may execute on a cloud-based system. The data attributes may comprise a plurality of, a minimum data value, a maximum data value, a default data value, a flight management state when data entry for the at least one data item is valid. The requesting data attributes for at least one widget on the displayed page may comprise requesting data attributes for a plurality of widgets on the displayed page, requesting data attributes only for a widget on the displayed page that is in focus, or requesting data attributes only for a widget on the displayed page through which data must be entered before data may be entered via another widget on the displayed page. The data attributes may identify when an operation is valid based upon an object being modified or when an operation is valid based upon a supported feature within the flight management engine.

The example process 300 includes restricting data entry via the at least one widget in conformance with each limit provided by the data attributes for the widget (operation 308) and transmitting data entered via the at least one widget in conformance with the received data attributes to the flight management engine (operation 310).

Figure 4:
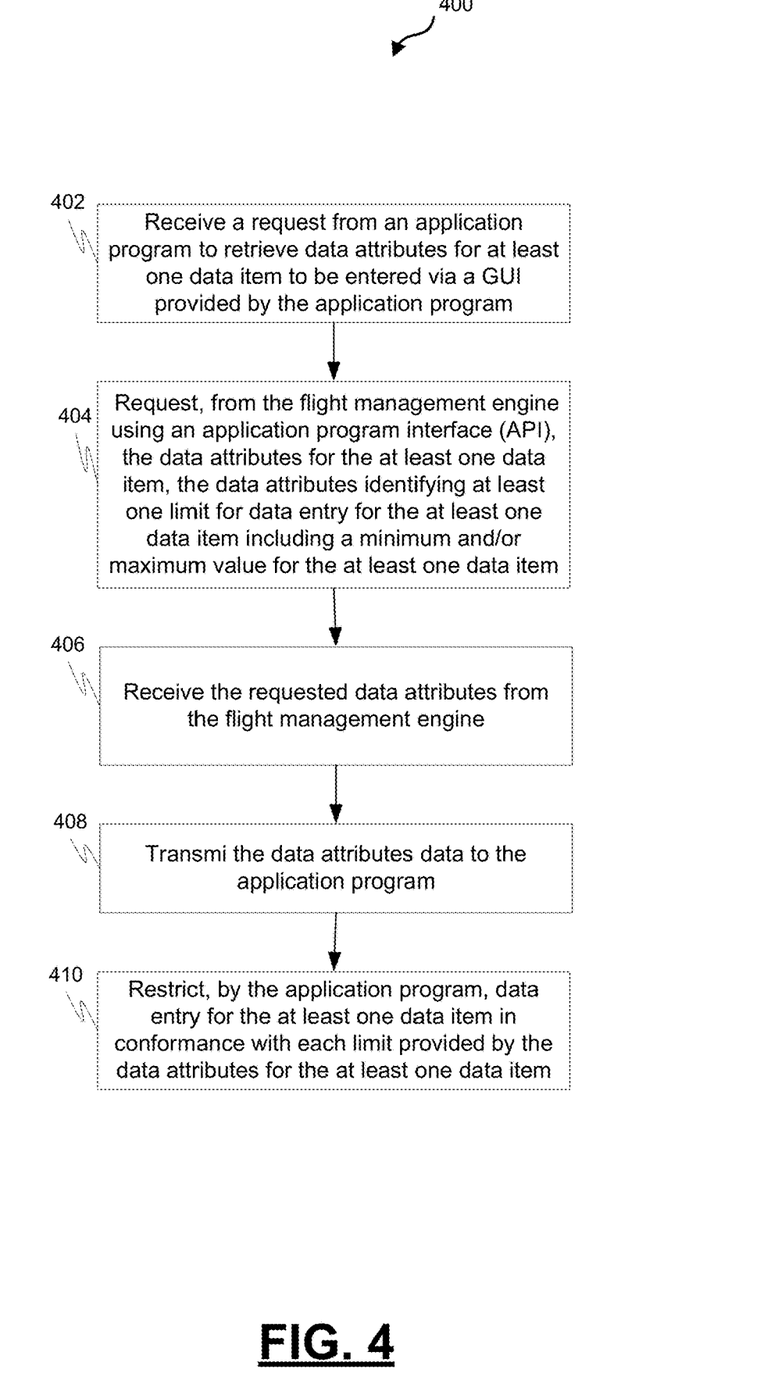
FIG. 4 is a process flow chart depicting an example process in an aircraft for the validation of variable data, in accordance with some embodiments.

FIG. 4 is a process flow chart depicting an example process 400 in an aircraft for the validation of variable data. The order of operation within the process 400 is not limited to the sequential execution as illustrated in the figure, but may be performed in one or more varying orders as applicable and in accordance with the present disclosure.

The example process 400 includes receiving a request from an application program to retrieve data attributes for at least one data item to be entered via a GUI provided by the application program (operation 402). The data attributes are internally computed by a flight management engine associated with the aircraft and used by the flight management engine to validate data. The flight management engine may execute onboard the aircraft. The flight management engine may execute on a cloud-based system. The data attributes may comprise a plurality of, a minimum data value, a maximum data value, a default data value, and a flight management state when data entry for the at least one data item is valid. The data attributes identify when an operation is valid based upon object being modified, or when an operation is valid based upon a supported feature within the flight management engine.

The example process 400 includes requesting, from the flight management engine using an application program interface (API), the data attributes for the at least one data item, wherein the data attributes identify at least one limit for data entry for the at least one data item and wherein the limit includes a minimum and/or maximum value for the at least one data item. (operation 404). The requesting data attributes for the at least one data item may comprise requesting data attributes for a plurality of widgets on the displayed page, requesting data attributes only for a widget on the displayed page that is in focus, or requesting data attributes only for a widget on the displayed page through which data must be entered before data may be entered via another widget on the displayed page.

The example process 400 includes receiving the requested data attributes from the flight management engine (operation 406), transmitting the data attributes to the application program (operation 408), and the application program restricting data entry for the at least one data item in conformance with each limit provided by the data attributes for the at least one data item (operation 410).

Described herein are apparatus, systems, techniques and articles for the validation of variable data entry on an aircraft. In one embodiment, a system on an aircraft for the validation of variable data is provided. The system comprises one or more processors configured by programming instructions on non-transient computer readable media. The system is configured to, provide a graphical user interface that includes one or more pages for display on a display device on the aircraft, wherein at least one of the pages includes one or more widgets for the entry of data-, cause the at least one page to be displayed on the display device; request, from a flight management engine associated with the aircraft using an application program interface (API), data attributes for at least one widget on the displayed page, wherein the data attributes identify at least one limit for data entry including a minimum and/or maximum value for data input via the at least one widget, receive the requested data attributes from the flight management engine; restrict data entry via the at least one widget in conformance with each limit provided by the data attributes for the widget; and transmit data entered via the at least one widget in conformance with the received data attributes to the flight management engine.

These aspects and other embodiments may include one or more of the following features. The data attributes may comprise a plurality of: a minimum data value, a maximum data value, a default data value, and/or a flight management state during which data entry for the at least one data item is valid. To request data attributes for at least one widget on the displayed page may the system may be configured to request data attributes for a plurality of widgets on the displayed page. To request data attributes for at least one widget on the displayed page may the system may be configured to request data attributes only for a widget on the displayed page that is in focus. To request data attributes for at least one widget on the displayed page may the system may be configured to request data attributes only for a widget on the displayed page through which data must be entered before data may be entered via another widget on the displayed page. The flight management engine may execute onboard the aircraft. The flight management engine may execute on a cloud-based system. The data attributes may identify when an operation is valid based upon the object being modified, and/or when an operation is valid based upon a supported feature within the flight management engine.

In another embodiment, a system on an aircraft for the validation of variable data is provided. The system comprises one or more processors configured by programming instructions on non-transient computer readable media. The system is configured to: receive a request from an application program to retrieve data attributes for at least one data item to be entered via a GUI provided by the application program, wherein the data attributes are internally computed by a flight management engine associated with the aircraft and used by the flight management engine to validate data; request, from the flight management engine using an application program interface (API), the data attributes for the at least one data item, wherein the data attributes identify at least one limit for data entry for the at least one data item including a minimum and/or maximum value for the at least one data item; receive the requested data attributes from the flight management engine, and transmit the data attributes to the application program; wherein the application program restricts data entry for the at least one data item in conformance with each limit provided by the data attributes for the at least one data item.

These aspects and other embodiments may include one or more of the following features. The data attributes comprise a plurality of: a minimum data value, a maximum data value, a default data value, and/or a flight management state during which data entry for the at least one data item is valid. To request data attributes for at least one data item the system may be configured to request data attributes for a plurality of data items. To request data attributes for at least one data item may the system may be configured to request data attributes only for a data item that is in focus. To request data attributes for at least one data item the system may be configured to request data attributes only for a data item through which data must be entered before data may be entered via another data item. The flight management engine may execute onboard the aircraft. The flight management engine may execute on a cloud-based system. The data attributes may identify when an operation is valid based upon an object being modified, and/or when an operation is valid based upon a supported feature within the flight management engine.

In another embodiment, a method in an executable application on an electronic device on an aircraft during an aircraft mission is provided. The method comprises providing a graphical user interface that includes one or more pages for display on a display device on an aircraft, wherein at least one of the pages includes one or more widgets for the entry of data; causing the at least one page to be displayed on the display device; requesting, from a flight management engine using an application program interface (API) data attributes for at least one widget on the displayed page, wherein the data attributes identify at least one limit for data entry for the at least one data item including a minimum and/or maximum value for data input via the at least one widget, receiving the requested data attributes from the flight management engine; restricting data entry via the at least one widget in conformance with each limit provided by the data attributes for the widget; and transmitting data entered via the at least one widget in conformance with the received data attributes to the flight management engine.

These aspects and other embodiments may include one or more of the following features. The data attributes comprise a plurality of: a minimum data value, a maximum data value, a default data value, and/or a flight management state during which data entry for the at least one data item is valid. The requesting data attributes for at least one widget on the displayed page may comprise requesting data attributes for a plurality of widgets on the displayed page. The requesting data attributes for at least one widget on the displayed page may comprise requesting data attributes only for a widget on the displayed page that is in focus. The requesting data attributes for at least one widget on the displayed page may comprise requesting data attributes only for a widget on the displayed page through which data must be entered before data may be entered via another widget on the displayed page. The flight management engine may execute onboard the aircraft. The flight management engine may execute on a cloud-based system. The data attributes may identify when an operation is valid based upon an object being modified, and/or when an operation is valid based upon a supported feature within the flight management engine.

In another embodiment, a method in an aircraft for the validation of variable data is provided. The method comprises: receiving a request from an application program to retrieve data attributes for at least one data item to be entered via a GUI provided by the application program, wherein the data attributes are internally computed by a flight management engine associated with the aircraft and used by the flight management engine to validate data; requesting, from the flight management engine using an application program interface (API), the data attributes for the at least one data item, wherein the data attributes identify at least one limit for data entry for the at least one data item including a minimum and/or maximum value for the at least one data item receiving the requested data attributes from the flight management engine; and transmitting the data attributes to the application program; wherein the application program restricts data entry for the at least one data item in conformance with each limit provided by the data attributes for the at least one data item.

These aspects and other embodiments may include one or more of the following features. The data attributes comprise a plurality of: a minimum data value, a maximum data value, a default data value, and/or a flight management state during which data entry for the at least one data item is valid. The requesting data attributes for at least one data item may comprise requesting data attributes for a plurality of data items on the displayed page. The requesting data attributes for at least one data item may comprise requesting data attributes only for a data item on the displayed page that is in focus. The requesting data attributes for at least one data item may comprise requesting data attributes only for a data item on the displayed page through which data must be entered before data may be entered via another data item on the displayed page. The flight management engine may execute onboard the aircraft. The flight management engine may execute on a cloud-based system. The data attributes may identify when an operation is valid based upon an object being modified, and/or when an operation is valid based upon a supported feature within the flight management engine.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components. e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art An exemplary storage medium is coupled to the processor such that the processor can read information from and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims

What is claimed is:

1. A system on an aircraft for validating variable data, the system comprising one or more processors configured by programming instructions on non-transitory computer readable media, the system configured to:
provide a graphical user interface that includes one or more pages for display on a display device on the aircraft, wherein at least one page of the one or more pages includes one or more widgets for entering data;
cause the at least one page to be displayed on the display device;
request, from a flight management engine associated with the aircraft using an application program interface (API), data attributes for at least one widget on the displayed page, the data attributes identifying a minimum or maximum value for data that is input via the at least one widget;
receive the requested data attributes from the flight management engine;
cause the at least one widget to display a title that identifies a type of data that may be entered via the widget, a data entry block for receiving data entry, and a limits field that identifies the minimum or maximum value received from the flight management engine in the data attributes;
restrict data entry via the at least one widget in conformance with the minimum or maximum value provided by the data attributes for the at least one widget; and
transmit data entered via the at least one widget in conformance with the data attributes to the flight management engine.

2. The system of claim 1, wherein the data attributes comprise a plurality of: a minimum data value, a maximum data value, a default data value, and/or a flight management state during which data entry for the at least one widget is valid.

3. The system of claim 1, wherein to request data attributes for at least one widget on the displayed page the system is configured to request data attributes for a plurality of widgets on the displayed page.

4. The system of claim 1, wherein to request data attributes for at least one widget on the displayed page the system is configured to request data attributes only for a widget on the displayed page that is in focus.

5. The system of claim 1, wherein to request data attributes for at least one widget on the displayed page the system is configured to request data attributes only for a widget on the displayed page through which data must be entered before data may be entered via another widget on the displayed page.

6. The system of claim 1, wherein the flight management engine executes onboard the aircraft.

7. The system of claim 1, wherein the flight management engine executes on a cloud-based system.

8. The system of claim 1, wherein the data attributes identify when an operation is valid based upon an object being modified, and/or when an operation is valid based upon a supported feature within the flight management engine.

9. A system on an aircraft for validating variable data, the system comprising one or more processors configured by programming instructions on non-transitory computer readable media, the system configured to:
receive a request from an application program to retrieve data attributes for at least one data item to be entered via a GUI provided by the application program, wherein the data attributes are internally computed by a flight management engine associated with the aircraft and used by the flight management engine to validate data;
request, from the flight management engine using an application program interface (API), the data attributes for the at least one data item, the data attributes identifying a minimum or maximum value for the at least one data item;
receive the requested data attributes from the flight management engine; and
transmit the data attributes to the application program;
wherein the application program:
displays, for the at least one data item, a title that identifies a type of data for the at least one data item, a data entry block for receiving data entry, and a limits field that identifies the minimum or maximum value for the at least one data item received from the flight management engine in the data attributes; and
restricts data entry for the at least one data item in conformance with the minimum or maximum value provided by the data attributes for the at least one data item.

10. The system of claim 9, wherein the data attributes comprise a plurality of: a minimum data value, a maximum data value, a default data value, a flight management state during which data entry for the at least one data item is valid.

11. The system of claim 9, wherein to request the data attributes for the at least data item the system is configured to request the data attributes for a plurality of data items.

12. The system of claim 9, wherein the flight management engine executes onboard the aircraft.

13. The system of claim 9, wherein the flight management engine executes on a cloud-based system.

14. The system of claim 9, wherein the data attributes identify when an operation is valid based upon an object being modified, and/or when an operation is valid based upon a supported feature within the flight management engine.

15. A method in an executable application on an electronic device on an aircraft during an aircraft mission, the method comprising:
providing a graphical user interface that includes one or more pages for display on a display device on an aircraft, wherein at least one of the pages includes one or more widgets for entering data;
causing the at least one page to be displayed on the display device;
requesting, from a flight management engine using an application program interface (API), data attributes for at least one widget on the displayed page, the data attributes identifying a minimum or maximum value for data that is input via the at least one widget;
receiving the requested data attributes from the flight management engine;
displaying, in the at least one widget, a title that identifies a type of data that may be entered via the widget, a data entry block for receiving data entry, and a limits field that identifies the minimum or maximum value for data entry received from the flight management engine in the data attributes;
restricting data entry via the at least one widget in conformance with the minimum or maximum value provided by the data attributes for the widget; and
transmitting data entered via the at least one widget in conformance with the received data attributes to the flight management engine.

16. The method of claim 15, wherein the data attributes comprise a plurality of: a minimum data value, a maximum data value, a default data value, and/or a flight management state during which data entry for the at least one widget is valid.

17. The method of claim 15, wherein the requesting data attributes for at least one widget on the displayed page comprises requesting data attributes for a plurality of widgets on the displayed page.

18. The method of claim 15, wherein the requesting data attributes for at least one widget on the displayed page comprises requesting data attributes only for a widget on the displayed page that is in focus.

19. The method of claim 15, wherein the flight management engine executes on a cloud-based system.

20. The method of claim 15, wherein the data attributes identify when an operation is valid based upon an object being modified, and/or when an operation is valid based upon a supported feature within the flight management engine.

* * * * *